(12) United States Patent
De La Iglesia et al.

(10) Patent No.: US 7,298,746 B1
(45) Date of Patent: Nov. 20, 2007

(54) METHOD AND SYSTEM FOR REASSEMBLING AND PARSING PACKETS IN A NETWORK ENVIRONMENT

(75) Inventors: Erik De La Iglesia, Mountain View, CA (US); Miguel Gomez, Fremont, CA (US); Rahoul Puri, Los Altos, CA (US); Chien C. Chou, San Jose, CA (US); Kiet Tran, Saratoga, CA (US)

(73) Assignee: Extreme Networks, Santa Clara, CA (US)

( * ) Notice: Subject to any disclaimer, the term of this patent is extended or adjusted under 35 U.S.C. 154(b) by 815 days.

(21) Appl. No.: 10/127,372

(22) Filed: Apr. 22, 2002

Related U.S. Application Data

(63) Continuation-in-part of application No. 10/098,957, filed on Feb. 11, 2002.

(60) Provisional application No. 60/355,922, filed on Feb. 11, 2002.

(51) Int. Cl.
 *H04L 12/56* (2006.01)
(52) U.S. Cl. .................................................. 370/394
(58) Field of Classification Search ................ 370/389, 370/392, 397, 394; 709/227–229
 See application file for complete search history.

(56) References Cited

U.S. PATENT DOCUMENTS

| | | | |
|---|---|---|---|
| 4,766,534 A | 8/1988 | DeBenedictis | |
| 5,315,708 A * | 5/1994 | Eidler et al. ................. | 711/119 |
| 5,396,490 A * | 3/1995 | White et al. ................. | 370/474 |
| 5,440,545 A * | 8/1995 | Buchholz et al. ........... | 370/426 |
| 5,528,761 A | 6/1996 | Ooba et al. | |
| 5,553,242 A | 9/1996 | Russell et al. | |
| 5,561,807 A * | 10/1996 | Verplanken et al. ........ | 719/314 |
| 5,745,694 A | 4/1998 | Egawa et al. | |
| 5,815,516 A * | 9/1998 | Aaker et al. ................. | 714/807 |
| 5,826,082 A | 10/1998 | Bishop et al. | |
| 5,937,169 A | 8/1999 | Connery et al. | |
| 5,974,518 A * | 10/1999 | Nogradi ....................... | 711/173 |
| 6,018,516 A | 1/2000 | Packer ......................... | 370/231 |
| 6,044,468 A | 3/2000 | Osmond ....................... | 713/201 |
| 6,091,733 A | 7/2000 | Takagi et al. ................ | 370/401 |
| 6,195,703 B1 | 2/2001 | Blumenau et al. .......... | 709/238 |
| 6,208,650 B1 * | 3/2001 | Hassell et al. ............... | 370/392 |
| 6,212,190 B1 | 4/2001 | Mulligan | |
| 6,233,615 B1 | 5/2001 | Van Loo | |
| 6,247,060 B1 | 6/2001 | Boucher et al. ............. | 709/238 |

(Continued)

OTHER PUBLICATIONS

Dykstra; *Gigabit Ethernet Jumbo Frames: and why you should care*; http://sd_wareonearth.com/~phil/jumbo.html (Dec. 20, 1999).

(Continued)

*Primary Examiner*—Dmitry Levitan
(74) *Attorney, Agent, or Firm*—Howrey LLP

(57) ABSTRACT

A packet reassembly system includes a buffer for storing information elements included in one or more incoming packets, a memory for storing validity indicators corresponding to the information elements, a first logic circuit capable of setting the validity indicators based on the information elements stored in the buffer, and a second logic circuit capable of determining the contiguity of the information elements stored in the buffer based on the settings of the validity indicators.

20 Claims, 5 Drawing Sheets

U.S. PATENT DOCUMENTS

| | | | |
|---|---|---|---|
| 6,298,280 B1 | 10/2001 | Coile et al. | 709/227 |
| 6,304,906 B1 | 10/2001 | Bhatti et al. | |
| 6,327,622 B1 | 12/2001 | Jindal et al. | |
| 6,341,129 B1 | 1/2002 | Schroeder et al. | |
| 6,363,421 B2 | 3/2002 | Barker et al. | |
| 6,411,986 B1 | 6/2002 | Susai et al. | |
| 6,453,360 B1 | 9/2002 | Muller et al. | |
| 6,480,489 B1 | 11/2002 | Muller et al. | |
| 6,483,840 B1 * | 11/2002 | Vogel | 370/401 |
| 6,490,281 B1 * | 12/2002 | Abler et al. | 370/394 |
| 6,526,056 B1 | 2/2003 | Rekhter et al. | |
| 6,532,487 B1 | 3/2003 | Perks | |
| 6,549,516 B1 | 4/2003 | Albert et al. | |
| 6,549,540 B1 * | 4/2003 | Ward | 370/412 |
| 6,549,961 B1 | 4/2003 | Kloth | |
| 6,606,315 B1 | 8/2003 | Albert et al. | |
| 6,606,316 B1 | 8/2003 | Albert et al. | |
| 6,625,650 B2 | 9/2003 | Stelliga | |
| 6,628,654 B1 | 9/2003 | Albert et al. | |
| 6,633,560 B1 | 10/2003 | Albert et al. | |
| 6,650,641 B1 | 11/2003 | Albert et al. | |
| 6,687,222 B1 | 2/2004 | Albert et al. | |
| 6,704,278 B1 | 3/2004 | Albert et al. | |
| 6,714,985 B1 | 3/2004 | Malagrino et al. | |
| 6,724,767 B1 * | 4/2004 | Chong et al. | 370/412 |
| 6,728,748 B1 | 4/2004 | Mangipudi et al. | |
| 6,735,169 B1 | 5/2004 | Albert et al. | |
| 6,742,045 B1 | 5/2004 | Jordan et al. | |
| 6,775,692 B1 | 8/2004 | Albert et al. | |
| 6,781,992 B1 * | 8/2004 | Rana et al. | 370/394 |
| 6,788,704 B1 | 9/2004 | Lindsay | |
| 6,836,462 B1 | 12/2004 | Albert et al. | |
| 6,839,811 B2 | 1/2005 | Fujiyama | |
| 6,891,839 B2 | 5/2005 | Albert et al. | |
| 6,937,606 B2 * | 8/2005 | Basso et al. | 370/412 |
| 6,973,097 B1 | 12/2005 | Donzis et al. | |
| 7,065,086 B2 | 6/2006 | Basso et al. | |
| 7,072,981 B1 | 7/2006 | O'Rourke et al. | |
| 2001/0034792 A1 | 10/2001 | Swildens | |
| 2001/0052006 A1 | 12/2001 | Barker et al. | |
| 2001/0055317 A1 | 12/2001 | Kajizaki et al. | |
| 2002/0016856 A1 | 2/2002 | Tallegas et al. | |
| 2002/0087694 A1 | 7/2002 | Daoud et al. | |
| 2002/0129127 A1 | 9/2002 | Romero et al. | |
| 2002/0141401 A1 | 10/2002 | Albert et al. | |
| 2003/0009561 A1 | 1/2003 | Sollee | |
| 2003/0014525 A1 | 1/2003 | De Lima et al. | |
| 2003/0093496 A1 | 5/2003 | O'Connor et al. | |
| 2003/0149690 A1 | 8/2003 | Kudlacik et al. | |
| 2004/0162901 A1 | 8/2004 | Mangipudi et al. | |
| 2005/0010754 A1 | 1/2005 | Brendel | |
| 2006/0080446 A1 | 4/2006 | Bahl | |

OTHER PUBLICATIONS

Hornig, *Network Working Group RFC: 894; DARPA Internet Program Protocol Specification* (Apr. 1984).

Information Sciences Institute, University of Southern California, *Internet Protocol RFC: 791; DARPA Internet Program Protocol Specification* (Sep. 1981).

Information Sciences Institute, University of Southern California, *Transmission Control Protocol RFC: 793; DARPA Internet Program Protocol Specification* (Sep. 1981).

Postel, *Network Working Group RFC: 879; DARPA Internet Program Protocol Specification* (Nov. 1983).

Saunders, Stephen et al.; "The Policy Makers"; Data Communications; pp. 34-35 and 36-56 (even only).

Postel, "RFC 792—ICMP," 1981, pp. 1-4.

Mogul et al., "RFC 1191—Path MTU Discovery," 1990, pp. 1-3.

* cited by examiner

| Area Name | Size (bytes) | Offset Range | Description |
|---|---|---|---|
| TCB Storage | 128 | 'h000 – 'h07F | Storage for TCB data from PM |
| Queue Memory | 64 | 'h080 – 'h0BF | Used as part of deferred event fifo |
| Summary Area | 128 | 'h0C0 – 'h13F | All state information and summarized encoding of validation area |
| Validation Area | 192 | 'h140 – 'h1FF | Valid bits for every byte in Reassembly Area |
| Reassembly Area | 1536 | 'h200 – 'h7FF | Circular Queue for incoming data |

*FIG. 6B*

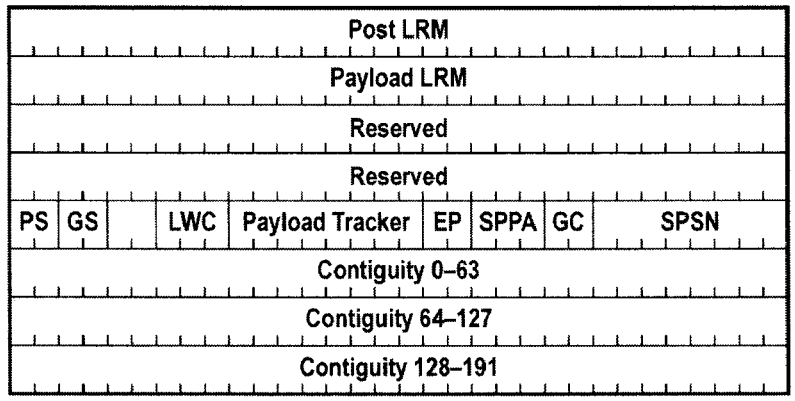

*FIG. 7A*

| Field Name | Bits | Description |
|---|---|---|
| Post LRM | 128 | Post Entity Length Rewrite Mailbox |
| Payload LRM | 128 | Payload Length Rewrite Mailbox |
| SPSN | 32 | Start Pointer Sequence Number |
| GC | 8 | Generation Count |
| SPPA | 12 | Start Pointer Physical Address |
| EP | 8 | End Pointer |
| Payload Tracker | 32 | Payload Tracker |
| LWC | 12 | Leftwise Contiguity |
| GS | 8 | General Status |
| PS | 4 | Principle Status |
| Contiguity | 192 | Summary Contiguity and Completeness Map |

*FIG. 7B*

| Field Name | Bit Location | Description |
| --- | --- | --- |
| Header Assembly | 7 | Current Object is the first 1460 bytes of a header |
| Long Header Assembly | 6 | Current Object is a header greater than 1460 bytes long |
| Payload Assembly | 5 | Current Object is the first portion of a payload |
| Long Payload Assembly | 4 | Current Object is a 1460 byte portion of a payload |
| Final Payload Assembly | 3 | Current Object is the final portion of a payload |
| Assembly Completed | 2 | The complete object has been assembled |
| Buffer Filled | 1 | The entire 1460 byte buffer has been filled |
| Pipelining Detect | 0 | Indicated that residual data was present in the buffer after a purge. This is a sticky condition and will not be cleared until the buffer is reset. |

*FIG. 8A*

| Field Name | Bit Location | Description |
| --- | --- | --- |
| Header Valid | 3 | Buffer is valid and contains valid general status |
| Object Class | 2:0 | Defines the termination conditions for the buffer |

*FIG. 8B*

| Object Class | Bit Code | Description |
| --- | --- | --- |
| HTTP | 000 | Completeness determined by contiguity and end-of-message token recognition |
| SSL | 001 | Completeness defined by meeting length in SSL Length register |
| Immediate Post | 010 | Completeness defined by meeting length in SSL Length register |
| Reserved | 001:111 | Not supported, indeterminate action |

*FIG. 8C*

| State Name | Encoding | Description |
| --- | --- | --- |
| Incomplete | 'b00 | All 8 validation bits are not set |
| Complete | 'b01 | Al l8 validation bits are set |
| Incomplete End | 'b10 | End (CRLFx2) in this word, but not contiguous |
| Complete End | 'b11 | End (CRLFx2) in this word and all previous bytes in word contiguous |

*FIG. 9*

METHOD AND SYSTEM FOR REASSEMBLING AND PARSING PACKETS IN A NETWORK ENVIRONMENT

This application claims the benefit of U.S. Provisional Application No. 60/355,922, entitled "Network Switch", filed Feb. 11, 2002, and is a continuation-in-part of U.S. patent application Ser. No. 10/098,957 entitled "Switching System", filed Feb. 11, 2002. Both of these applications are fully incorporated by reference herein as though set forth in full.

RELATED APPLICATIONS

This application is related to U.S. patent application Ser. No. 10/073,483, entitled "Method Of And System For Allocating Resources To Resource Requests Based On Application Of Persistence Policies," filed Feb. 11, 2002; U.S. patent application Ser. No. 10/075,051, entitled "Method Of And System For Allocating Resources To Resource Requests Based On Application Of Persistence Policies," filed Feb. 12, 2002; U.S. Patent Application No. To Be Determined, BSTZ Ref. No. 02717.P056, entitled "Method Of And System For Allocating Resources To Resource Requests," filed Feb. 11, 2002; U.S. patent application Ser. No. 10/073,538, entitled "Method And System For Maintaining Temporal Consistency Of Resources And Data In A Multiple-Processor Packet Switch," filed Feb. 11, 2002; U.S. patent application Ser. No. 10/073,638, entitled "Method And System For Managing Traffic In A Packet Network Environment," filed Feb. 11, 2002; U.S. patent application Ser. No. 10/073,484, entitled "Method And System For Translating Packet Sizes In A Network," filed Feb. 11, 2002. Each of the foregoing applications is owned in common by the assignee hereof, and each is hereby fully incorporated herein by reference as though set forth in full.

BACKGROUND OF THE INVENTION

1. Field of the Invention

The present invention generally relates to communication networks, and more particularly, to packet networks for carrying information between hosts such as computers.

2. Related Art

Computer networks are often described with the aid of layered reference models for depicting the movement of information between host computers connected to the network. The layers help to segregate information and network functions into manageable units. The general functions of each layer are often based on an international standard called Open System Interconnection (OSI). OSI sets forth seven processing layers through which information may pass when received by a host in order to be presentable to a non-user. Similar, transmission of information from a host to the network may pass through those seven processing layers in reverse order.

Another layered reference model that is widely implemented is called TCP/IP (Transmission Control Protocol/Internet Protocol). A more complete definition of TCP/IP is given in RFC793, "Transmission Control Protocol", and RFC791, "Internet Protocol", published by the Defense Advanced Research Projects Agency (DARPA), hereby incorporated by reference.

A TCP/IP connection is managed by TCP, which uses sequence numbers, a maximum segment size (MSS), and a sliding window as flow control mechanisms.

When a TCP/IP connection is established, both the client and server transmit their respective 32-bit initial sequence numbers (ISN) as well as a maximum segment size (MSS). The server acknowledges receipt of the client's data by sending an acknowledge (ACK) to the client. Establishing a connection allows the client to send a segment of data to the server. A segment includes one or more packets. The beginning of the client's segment is referenced by the client's ISN. The server is responsible for acknowledging segments by sending an acknowledge number equal to the client's ISN plus the length of the contiguous data received.

During connection establishment, the server opens a "window" allowing the client to send up to the number of bytes of data specified by that window to the server. The maximum number of bytes sent per data packet is defined by the MSS. The relative positions of the payload bytes within a packet is defined by the sequence number of the packet.

When packets are received out-of-order, the server is expected to reassemble the packets into a contiguous stream, using the sequence number of each packet as an index. The server is also expected to acknowledge the client properly.

In many networked devices running TCP or other similar transport protocols, this reassembly process is carried out in software, using linked list data structures to check for contiguity. Software approaches for reassembling and parsing contiguous packets are useful in some applications. However, conventional software implementations sometimes lack the necessary speed and performance for other applications. Thus, there is a need for an improved approach to the function of packet reassembly and parsing in a packet switched network.

SUMMARY OF THE INVENTION

It is an advantage of the present invention to provide an improved system and method for reassembling packets into a contiguous stream. It is also an advantage of the invention to provide an improved system and method for parsing information from incoming packet traffic.

According to an embodiment of the invention, a system is provided for handling packet traffic. The system includes a buffer for storing information elements included in one or more packets, a memory for storing validity indicators corresponding to the information elements, a first logic circuit capable of setting the validity indicators based on the sequence space of a packet, and a second logic circuit capable of determining the contiguity of the information elements stored in the buffer based on the settings of the validity indicators.

In accordance with a further embodiment of the invention, a method is provided for reassembling one or more packets. In this process, a data payload of a packet is stored in a buffer. The data unit is located in the buffer according to a sequence number associated with the packet. Next, an array of validity indicators, stored in a memory, is set. The validity indicators correspond positionally and directly to the data unit. The array of validity indicators is then scanned to determine whether the reassembly process is complete.

The use of validity indicators to track data in an assembly buffer significantly reduces the amount of time required to determine packet contiguity. In addition, through the use of validity indicators, the data payload can be parsed for tokens prior to complete contiguity being achieved. This allows for faster processing of messages.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 6a-b illustrate an exemplary buffer data structure usable in the buffer memory shown in FIG. 4.

FIGS. 7a-b illustrate exemplary fields included in the summary area of the buffer data structure.

FIGS. 8a-c are tables defining exemplary control fields included in the summary area of the buffer data structure.

FIG. 9 illustrates an exemplary encoding scheme for validation bits stored in the validation area of the buffer data structure of FIGS. 6a-b.

DETAILED DESCRIPTION

The following detailed description is not meant to limit the scope of the invention, but instead provides examples of packet switching systems and methods that more fully illustrate the principles of the invention.

Figure 1:
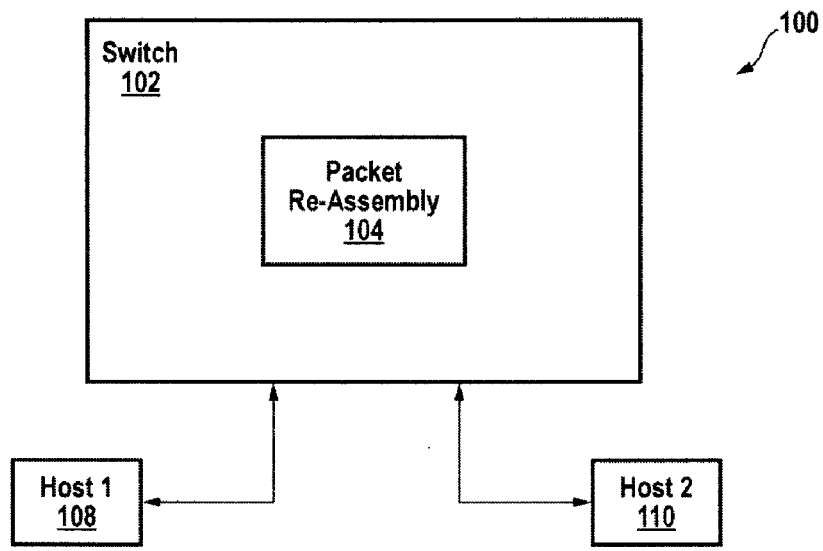
FIG. 1 is a block diagram illustrating an exemplary system in accordance with an embodiment of the present invention.

Turning now to the drawings, and in particular to FIG. 1, there is illustrated a system 100 in accordance with an exemplary embodiment of the present invention. The system 100 includes a switch 102 connected to one or more hosts 108, 110, such as clients and/or servers located on a network. The switch 102 allows the hosts 108, 110 to communicate with one another using a packet-based communication protocol, such as TCP/IP. Each connection may be physically distinct, or logically distinct while using the same physical connection mechanism.

Generally, the switch 102 receives incoming packets from the hosts 108, 110 and synthesizes output packets that have been formatted to improve throughput and overall system performance or perform some service or function such as NAT (Network Address Translation). In particular, the switch 102 can perform processing functions such as those described in the related application entitled "Switching System" (U.S. patent application Ser. No. 10/098,957), which is hereby incorporated by reference.

Included in the switch 102 is a packet reassembly engine 104 for processing packet traffic entering the switch 102. The reassembly engine 104 reassembles incoming packet data to ensure that the data is contiguous and without gaps so that further processing by the switch 102 can occur. In addition, the reassembly engine 104 can be configured to detect tokens and the like before incoming messages are completely reassembled. This serves to reduce processing latency and improve overall throughput of the switch 102.

Figure 2:
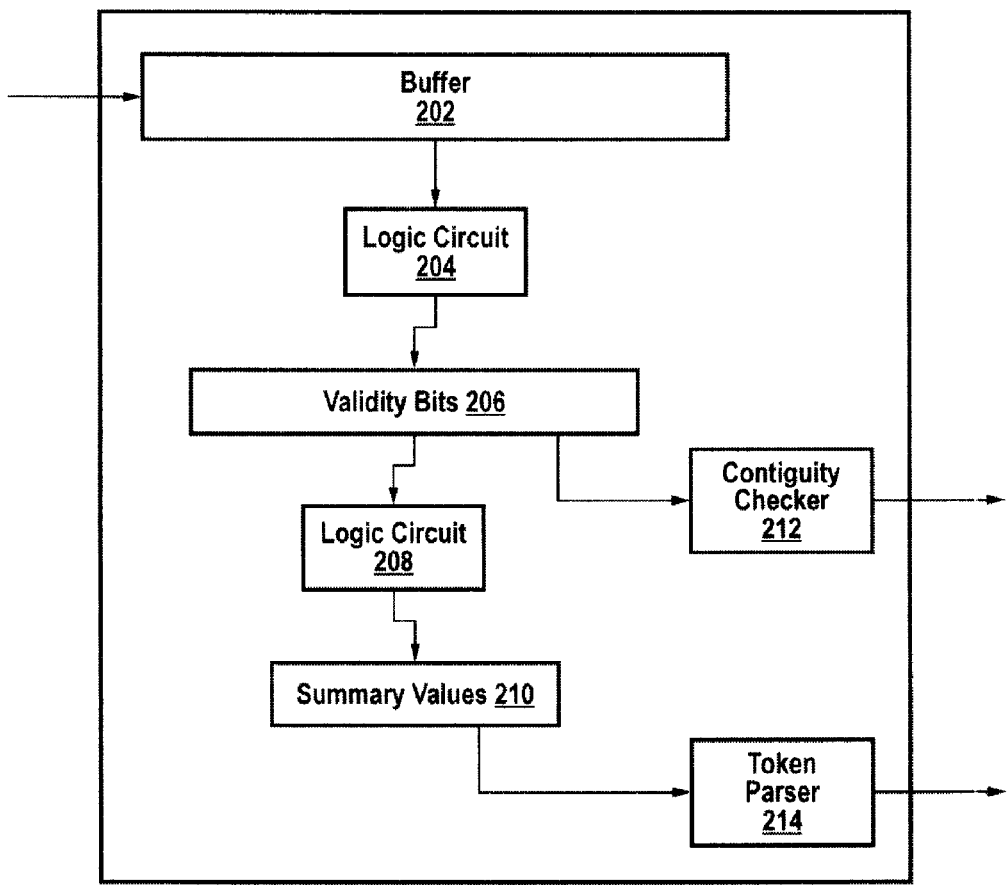
FIG. 2 is a block diagram illustrating details of the reassembly engine shown in FIG. 1, in accordance with a further embodiment of the invention.

FIG. 2 is a block diagram illustrating details of the packet reassembly engine 104. The reassembly engine 104 includes a buffer 202, a first logic circuit 204, validity bit storage 206, a second logic circuit 208, a summary bit storage 210, a contiguity checker 212, and a token parser 214. The buffer 202 stores one or more information elements included in incoming packets. The information elements can each represent a suitable chuck of data, such as a segment or byte included in the incoming data stream. The buffer 202 can be a circular buffer or queue.

The first logic circuit 304 sets validity bits stored in the validity memory 206. The settings of the validity bits are based on the information elements stored in the buffer 202 Preferably, there is a validity bit corresponding to each information element location in the buffer 202. The validity bit is set when an information element is stored at the respective location in the buffer 202, indicating that the location in the buffer contains valid data.

The second logic circuit 208 sets summary values that correspond to the validity bits. Each summary value can correspond to plural validity bits. Preferably, each summary value corresponds to eight validity bits in memory 206. The summary values can be two-bit values stored in the memory 210. The first bit of the summary value indicates whether complete contiguity exists for the information elements corresponding to the eight validity bits, i.e., all of the validity bits in the byte are set. The second bit of the summary value indicates that a predetermined token terminates within the eight information elements stored in the corresponding buffer locations.

This 2-bit encoding scheme for the summary values permits the contents of the assembly buffer to be pre-scanned for tokens prior to the occurrence of completed reassembly. Further details of an exemplary 2-bit encoding scheme usable with engine 104 is described herein connection with FIGS. 4-9.

The contiguity checker 212 can be a logic circuit, software component or any suitable combination of hardware/software components for determining the contiguity of the information elements stored in the buffer 202. The contiguity of the elements is determined based on the settings of the validity bits stored in memory 206. If a validity bit is set, this indicates that the corresponding location in the buffer 202 contains valid data. By scanning the memory 206 to determine which validity bits are set, the contiguity checker 212 can determine the degree and completeness of contiguity of a message being reassembled by the engine 104.

The token parser 214 can be a logic circuit or suitable hardware software component for determining whether a predetermined token is stored in the buffer 202. The token parser 214 makes this determination based on the summary values stored in memory 210.

Figure 3A:
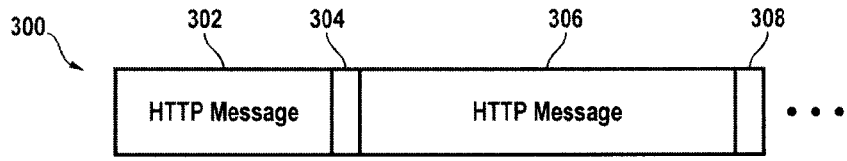
FIGS. 3a-b illustrate examples of HTTP messages that can be handled by the system of FIG. 1.

FIG. 3a illustrates an exemplary sequence of hypertext transfer protocol (HTTP) messages 300 that can be handled by the system of FIG. 1. A first HTTP message 302 is followed by a second HTTP message 306, as shown in FIG. 3a. The HTTP messages 302, 306 are separated by end-of-message tokens 304, 308 respectively. The end-of-message tokens 304, 308 can be HTTP standard terminators, as specified in RFC 2616.

Figure 3B:
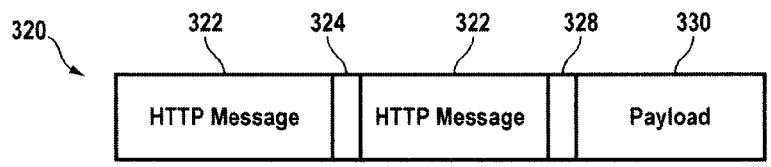

FIG. 3b shows a second exemplary HTTP message 320 that can be handled by the systems disclosed herein. The HTTP message 320 is a standard format that includes an HTTP header 322 having appended thereto a payload 330.

The HTTP header 322 is terminated by an end-of-message token 328. A payload length token 324 is included within the HTTP header 322.

The reassembly engine 104 can be implemented using one or more field programmable gate arrays (FPGAs), application specific integrated circuits (ASICs), or application specific standard products (ASSPs).

Figure 4:
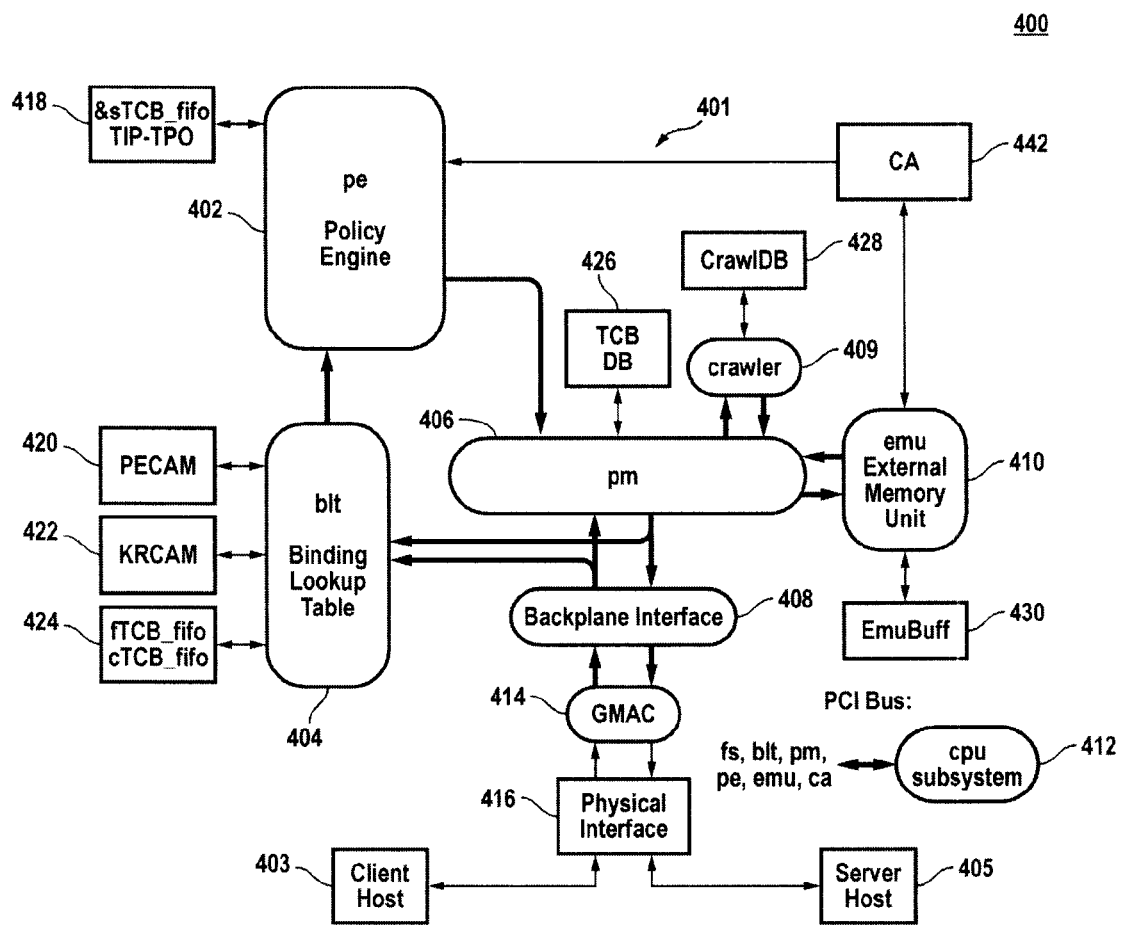
FIG. 4 is block diagram of an exemplary system in accordance with another embodiment of the present invention.

FIG. 4 is a block diagram of an exemplary system 400 in accordance with a further embodiment of the present invention. Packet reassembly, in accordance with the invention, is performed by an external memory unit (EMU) 410 included in the system 400. The system 400 includes a switch 401 connected to one or more client hosts 403 and one or more server hosts 405, such as computers. The switch 401 allows the client 403 and server 405 to communicate with one another using a packet-based communication protocol, such as TCP/IP.

The processing engines included in the switch 401 use internal messages to pass semaphores, e.g. a generation count and transaction label (tlabel), among themselves to coordinate operations and maintain temporal coherence for connections handled by the switch 401.

Generally, the packet switch 401 takes ingress traffic, classifies such traffic, performs rewrites, and then forwards that traffic. Similarly, packets are directed to the switch 401 by packet filters or forwarding entries configured into a host switch (not shown) with respect to virtual IP (VIP) addresses allocated to the switch 401. Traffic from the host switch arrives at the packet switch 401, is classified according to headers and content policies, undergoes rewrites by way of header construction, and then egresses back through the host switch.

The switch 401 architecture addresses layer 4 (L4)-layer 7 (L7) networking services, as referenced to the OSI seven layer model. These services can include services such as content-enabled server load-balancing (SLB) at gigabit Ethernet media rates. While emphasis is on content services, support is also provided for L4 (non-content) services, including SLB, at the same media rates.

The switch 401 can operate as a reverse-proxy between clients and servers, thus it can terminate both client-side and server-side TCP connections. The switch 401 can be implemented in the form of an intelligent processing card, which can be deployed as an appliance or as a blade in a gigabit Ethernet chassis switch (not shown).

The switch 401 is configured with forwarding data so that egress server traffic can reach the appropriate physical server hosts. Console and data access can be provided through administrative serial and Ethernet ports (not shown) included in the switch 401. These can be used for configuration and status reports.

The switch 401 includes a policy engine (PE) 402, a binding lookup table (BLT) 404, a packet manager (PM) 406, a backplane interface 408, a crawler 409, the EMU 410, a central processing unit (CPU) subsystem 412, a gigabit media access controller (GMAC) 414, and a physical interface 416. The switch 401 also includes a number of storage devices. Theses devices include one or more first-in-first-out (FIFO) memories 418 for storing server transmission control block (sTCB) pointers and switch internet protocol (IP) addresses (TIPs) and TCP port numbers (TPOs), a policy engine content addressable memory (PECAM) 420, a key reduction CAM (KRCAM) 422, one or more FIFOs 424 for storing flow TCB (fTCB) pointers and client (cTCB) pointers, a TCB database (DB) 426, a crawler database 428, and an EMU buffer 430.

The storage devices 418-430 are generally depicted in their preferred technologies in FIG. 4. However, alternative memory technologies, such as EEPROMs, RAMs, optical storage devices, or any other suitable storage means can be used to implement the storage devices 418-430.

The policy engine 402, BLT 404, packet manager 408, backplane interface 408, crawler 409, and EMU 410 can be implemented using any suitable combination of hardware and/or software components, and are preferably implemented in hardware using one or more field programmable gate arrays (FPGAs), such as the family of components with part numbers prefixed EP-20K, available from Altera, Inc. In addition or in the alternative, the above components can be implemented using one or more application specific integrated circuits (ASICs) or application specific standard products (ASSPs).

The functionality of the packet switch 401 is comprised of two partitions: a TCP/IP stack for packet handling and traffic management, and a proxy service for content analysis and policy selection. This functionality can be thought of as a protocol stack and an application running over that stack.

The TCP/IP protocol stack functionality is comprised of the backplane interface 408 for ingress packet pre-filtering and header classification, the BLT 404, which provides a traffic stream flow table, the PM 406, which includes a TCP/IP protocol state machine and rewrite engine, and the EMU 410, which provides a protocol reassembly manager and preliminary parser.

The proxy service partition includes the PE 402, which provides a server load-balancing policy engine and related scheduling and server tables.

The GMAC 414 and physical interface 416 include commercially-available components for implementing media access control (MAC) and physical layer protocols, such as gigabit Ethernet, for communicating with the hosts 403, 405 over a network. Two physical interfaces can be supported. The first is a 1000 BaseT copper interface, which connects to the physical interface 416. The full line rate is supported. The second interface is a backplane interface. This interface is full duplex and supports 1000 BaseT both into and out of the GMAC 414. If the packet switch 401 is deployed in a host switch then the backplane interface can be active. If the switch 401 is deployed as an appliance, then the CAT5 interface is active.

In addition to or alternatively, the physical interface can include components for interfacing to an optical network.

In addition to its functions described above, the backplane interface 408 can, based on protocol, channel incoming packets to the CPU 412. During normal operation only control packets are channeled to the CPU 412. The backplane interface 408 accepts outgoing packets from the CPU 412 or from the PM 406. In addition, packets may be transferred by direct memory access (DMA) directly from the CPU 412 subsystem. The backplane interface 408 also translates each packet from the internal formats used in switch 401 to the format used by the GMAC 414.

The CPU subsystem 412 can include a conventional complement of devices (CPU, RAM, ROM, Flash, etc). It communicates with the other components in the switch 401 through a 32 bit/50 MHz PCI interface. The primary interface to the user is the RS232, which supports a user console (not shown). The CPU card handles functions such as diagnostics, health checks, configuration and initialization of the switch 401, and the like.

The BLT 404 maintains a list of open TCP logical connections in the KRCAM 422. The search key to the CAM 422 is a five-tuple extracted from incoming IP packets. The five-tuple includes the source IP address, destination IP address, source TCP port, destination TCP port, and IP protocol field. As packets pass from the backplane interface 408 to the PM 406, they are examined by the BLT 404 and the five-tuple is extracted. The five-tuple is then applied to the KRCAM 422. The contents of the KRCAM 422 includes fTCB pointers to TCB data structures, which describe the state of the TCP connection. If the packet five-tuple hits, i.e., refers to an existing connection, then a TCB pointer from the KRCAM 422 is passed to the PM 406 so that the corresponding TCB can be accessed in the TCB database 426 during handling of the packet.

The cTCB and fTCB pointers, which are not currently in use are stored in the two FIFOs 424. These FIFOs are pre-loaded by the CPU 412 at boot time. The number of supported key-address pairs in the CAM is twice the total number of connections supported by the switch 401.

In addition to the 24-bit TCB pointers, the FIFO RAM holds an additional 8-bit generation count (GEN CNT) field in the high order byte of each FIFO entry. The GEN CNT is a semaphore passed forward to both the PE 402 and the PM 406 for use in other blocks. It is incremented every time the TCB pointer is recycled back into the FIFO 424 (rolling over after 256 recycles). This allows the BLT 404 to recycle the pointers into the appropriate resource pool when the PM 406 is tearing down a connection (doing DELETE requests).

As connections are torn down or timed out by the PM 406, the associated TCB pointers are removed from the key reduction CAM 422. The TCB pointers are recycled by returning then to the appropriate FIFO in BLT 404. Server TCB pointers are forwarded to the PE 402, which manages the pool of available sTCB indexes (pointers).

The purpose of the crawler 409 is to determine whether a specified time period has elapsed since the last activity seen on a connection. An activity can include a previous timeout detected by the crawler.

To accomplish this function, there is a separate crawler entry for each server TCB and for each client TCB in the crawler database 428. A state machine continually walks through the crawler DB 428 and examines each crawler entry to determine whether a timeout period has elapsed (i.e., it times out the connection).

There can be a predetermined number of timeout intervals supported by the crawler 410. These values can be stored in registers that are set by the CPU 412 at configuration time. If a new crawler entry is updated before the timeout period expires, then the entry is overwritten and any evidence of the previous values is discarded.

There are two interfaces between the PM 406 and the crawler 409. The first is a command interface, which the PM 406 uses to directly read or write the crawler entries. This is the interface used to instruct the crawler 409 to perform its timeout function on a specific client or server TCB. The second interface is a FIFO, which the crawler 409 uses to notify the PM 406 that a specified timeout period has elapsed for a specified TCB. The commands, which are accepted by the crawler 409 are shown in the table below:

| | |
|---|---|
| Init | Marks a crawler entry as valid. This command also specifies which timeout interval should be used for the timeout function. |
| Get | Returns the current contents of the crawler entry to the PM 406 via the command interface. |
| Update | The difference between an update and an init is that the crawler uses the control bits in the crawler entry (as opposed to initializing them). |
| Delete | This marks the crawler entry as invalid. When the crawler state machine next encounters this entry it will notify the PM 406 and the PM 406 will invalidate the corresponding TCB entry. |

If the crawler times out a connection it uses the FIFO interface to send a marker to the PM 406. The marker indicates which type of timeout period was selected and which TCB timed out. However, it is possible that when the timeout is detected, the FIFO from the crawler 409 to the PM 406 is full. In this case the crawler state machine will wait until its next pass through the crawler memory 428 to deposit the timeout. State is kept in the crawler 410 to indicate that the timeout already occurred.

Anytime that an L5 packet is handled and the TCB is fetched, the corresponding crawler entry is fetched. At the same time, the crawler state machine continues to walk through memory 428. Once a crawler entry has been read by the PM 406, the crawler state machine is prevented from updating that entry and from placing any timeout indicator associated with that entry in the crawler 109 to the PM 406 FIFO. Thus, the PM 406 can know that the entry, which it read, is valid until it is written back to crawler memory. This eliminates situations involving the timeout of a connection while a packet is being handled. During this time, other crawler entries are examined and timeouts that are associated with other entries may be written to the crawler 410 and to the PM 406 FIFO.

In operation, the switch 401 receives ingress traffic that is delivered from the host switch to the backplane interface 408, where such traffic is exposed to basic checks and header classifications. Most incoming traffic is forwarded to the PM 406 for TCP/IP protocol processing. In transit to the PM 406, traffic headers are snooped by BLT 404 to provide lookup indexes, which include TCB references and service indexes. Any traffic referencing a non-content-enabled service can be signaled to the policy engine 402 to get a server binding.

Client traffic arriving at the TCP/IP stack is initially classified as to which service is being requested (service index) and who is making the request (client identifier). For L4 situations, these values are used directly in the proxy service for policy considerations. For L5-7 (content-enabled) services, these initial values are qualified inside the proxy service according to configured content rules, and a final set of values is computed and used for policy considerations.

At the PM 406, a packet header is presented to the protocol state machine against the state given in the corresponding TCB that was identified by BLT 404. Relevant data is extracted from the packet header and applied to the TCB and then the header is stripped from the packet. A header rewrite is achieved by regenerating it on the egress side of the PM 406 from the corresponding TCB. If any content inspection is necessary, the packet body is forwarded to EMU 410 for reassembly and eventual presentation to the proxy service. In such cases, the packet body is not transmitted out of the switch 401 until a server binding has been made.

If a policy selection is necessary (e.g. for the head of a new traffic flow) the PM 406 is notified by the proxy service. The request to the proxy service is generated by the BLT 404 for L4 services, and the EMU 410 for L5-L7 services.

The EMU 410 reassembles a TCP data stream and determines if there is sufficient data to present to the proxy service for content analysis and policy selection. To do this it ensures that the data is contiguous and without gaps and that the start of the data is aligned with the expected TCP sequence number.

Figure 5:
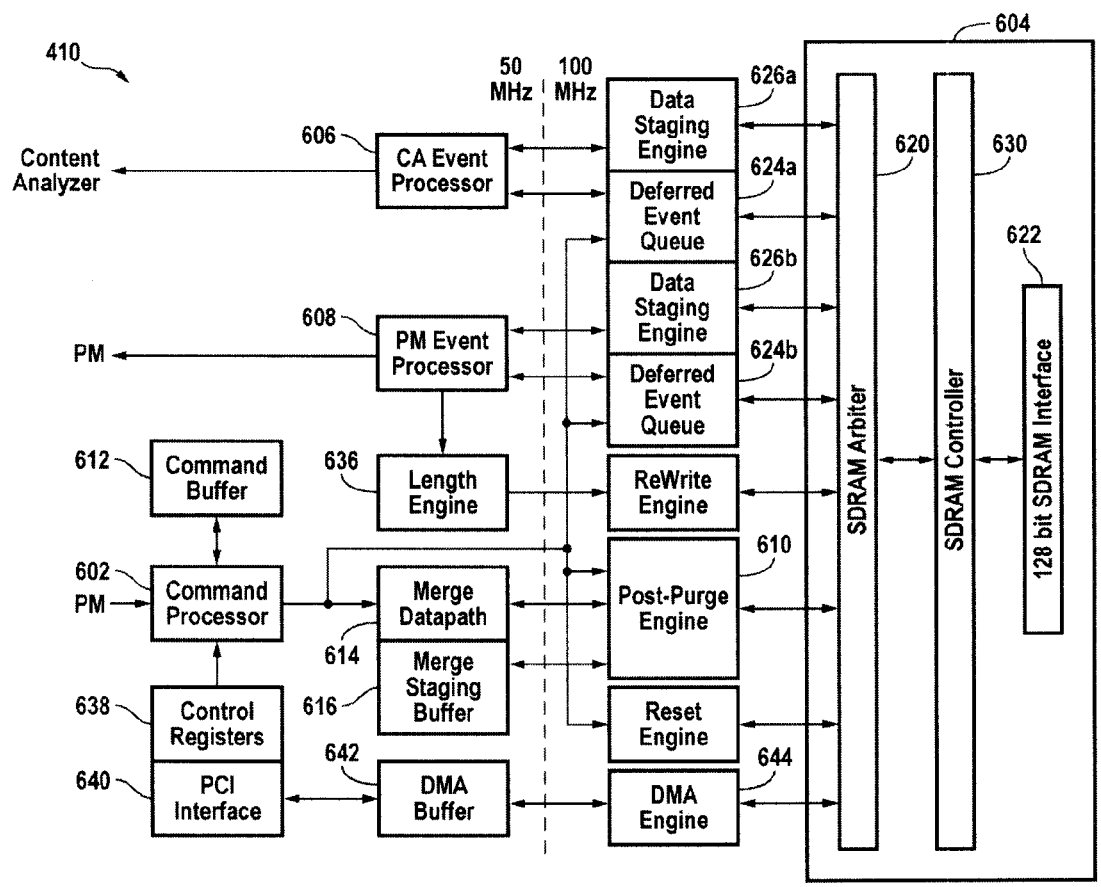
FIG. 5 is a block diagram illustrating details of the EMU shown in FIG. 4.

FIG. 5 is a block diagram illustrating details of the EMU 410 shown in FIG. 4. The EMU includes five primary components: the command processor 602, the SDRAM Subsystem 604, the CA event processor 606, the PM event processor 608 and the Post-Purge Engine 610. Each of the latter three components functions independently under the supervision of the command processor 602. The command processor interfaces with all other EMU control blocks and maintains the command buffer 612, which is a FIFO for the switch posts and commands. During a data post, the command processor controls the merge datapath 614 and the merge staging buffer 616.

The SDRAM subsystem 604 includes a 16-way arbiter 620 and an SDRAM physical interface 622. Arbitration for SDRAM access is performed on a priority mechanism favoring vital threads over deferred events. The CA event processor 606 retrieves buffer identities from the deferred event queue 624a-b corresponding to buffers containing completed headers. The associated data staging engine 626a-b buffers all data movement necessary to post these headers to the content analyzer 442.

The PM event processor 606 posts deferred acknowledgements, buffer reads, and notices of completed elements to the switch. Each of these deferred events is stored in the associated deferred event queue 624a-b and any data reads are managed by the associated data staging engine.

All the switch commands to the EMU 410 are buffered in the command buffer 612 and processed by the command processor 602. This buffer is 8 kbytes in size and serves to allow the EMU 410 to absorb long-latency commands. The relevant commands from the switch are Reset Buffer, Initialize Buffer, Read Buffer, Post to Buffer, Post with Deferred ACK and Purge Buffer Entity.

During a Post, the command processor 602 passes the post data into the merge datapath 614, where it is combined with the overlap data in the merge staging buffer 616 and prepared for an update to the buffer.

The EMU SDRAM subsystem 604 includes of a 128-bit physical interface 622 and a 16-port arbiter 620. The arbiter 620 uses single-cycle turnaround to allow arbitration for access while the previous access is completing. Data staging and merging is performed by the SDRAM controller 630. A priority matrix is established (at compile time) that determines the relative priority of each subunit requiring SDRAM access. Refresh cycles occur transparently.

The EMU CA event processor 606 is responsible for passing completed headers to the content analyzer 442. Completed buffers will have the corresponding buffer number posted as an entry in the CA deferred event queue 624a. The CA event processor 606 extracts entries from the queue 624a and performs the necessary memory operations to prepare the header for transmission to the content analyzer 442. In order to accommodate a CA Fast Bypass (transmitting a header directly to the content analyzer as it is posted from the switch, the CA event processor 606 arbitrates for ownership of the CA I280 interface.

The EMU PM event processor 608 is responsible for posting header data, deferred acknowledgements, and notification of completed elements to the switch. As with the CA event processor 606, events to be processed are extracted from the corresponding deferred event queue 624b. However, no bypass mechanism exists. This allows the PM event processor 608 to maintain control of the 1880 bus to the switch. Posts to the switch are scanned for entity length and content length. If identified, these lengths are rewritten to the corresponding buffer by the length engine 636.

The EMU post-purge engine 610 is a multi-threaded entity responsible for managing the header assembly, contiguity checking, header completeness checking and state transitions of a connection. It operated entirely in the 100 MHz domain and is triggered by the EMU command processor 602.

During a post from the switch, the post-purge engine 610 will calculate the offsets of the relevant staging information for header assembly and load the relevant connection information. The summary memory is fetched, updated, and scanned for contiguity and completeness. When the data post from the merge datapath 614 is complete, the post-purge engine 610 is also responsible for cataloging all end signatures found and adjusting the summary memory. During a Purge operation, no staging data is prepared, but the contiguity and completeness is evaluated and updated.

The control registers 638 include values settable and readable by the PM 406 to control operation and check the status of the EMU 410, respectively. The PCI interface 640, DMA buffer 642 and engine 644 permit direct memory access (DMA) to the buffer 430 by the PM 406 in predefined situations.

The data structure for connection information stored in the buffer 430 is shown in FIGS. 7a-b. The buffer 430 includes a summary area for each connection handled by the switch 401. Each summary area consists of a length rewrite field, a buffer control field and a contiguity bit field. The length rewrite field is a fast-rewrite field containing the length of the payload associated with the current header, a valid bit indicating if a payload was present in the header and a generation count obtained from the TCB storage at the time the length was identified. The generation count prevents any temporal discrepancies arising from connections that are reset while a data post to the PM 406 is in progress.

The generation count is associated with a connection. Because events processed by the EMU 410 are deferred, it is possible that a deferred event queue entry exists for a buffer, which has been reset and allocated to a new connection. The BLT 404 increments the generation count for every new connection. When deferred events are to be processed, the generation count is checked against the current generation count in the buffer. Events for buffers which no longer are valid are dropped.

The PE 402 accepts service index and client identifier values from the BLT 404 (for L4) and applies the service policies. For SLB, this involves establishing the physical server binding according to these general rules:
  a) check client history for similar requests from the same client; apply any such discovered binding (for stickiness), and
  b) apply scheduling rules for the appropriate server grouping to select and bind a physical server.

The PE 402 adjusts server usage counts and informs the protocol stack of the PM 406 of the server selection. The PM 406 can then forward the saved TCP data in the EMU 410 to the selected server.

If the packet passed from backplane interface 408 to the PM 406 is associated with a new connection, then there will be no entry in the KRCAM 422. In this case, the BLT 404 references the PECAM 420 with a three-tuple extracted from the packet as it passes between the PM 406 and the backplane 408. The three-tuple includes the destination IP address, destination port, and IP protocol field. The output of the PECAM 420 is a service index used to determine:

a) whether this new connection can be supported by the proxy;
b) whether the connection is requesting an L4 (non-content aware) or L5 (content aware) service; and
c) which particular service is being requested by the packet.

If the client is requesting a supported service, a new pointer to a TCB (L4 or L5) is extracted from the appropriate FIFO 424 and sent to the PM 406. In the case of an L4 connection, the information about the service requested is sent to the PE 402. If the new connection is an L5 connection all information is sent to the PM 406.

The BLT 404 can also be directed by the PM 406 to add a server→client connection to the KRCAM 422 once a connection is established. To obtain these directives, the BLT 404 snoops the bus used to send outgoing packets from the PM 406 to backplane interface 408. In this case there is no associated service information and the entry to the KRCAM 422 is a new entry.

When a connection is terminated the BLT 404 is informed by the PM 406. As with the server→client adds, these directives are snooped on the outgoing PM to backplane interface bus. When the BLT 404 is notified of a connection termination, it removes the corresponding KRCAM entry and returns the TCB pointer to the appropriate FIFO (L4 or L5).

The policy engine 402 receives L4 service requests from the BLT 404. The server description and proxy TIP/TPO databases provide the five-tuple associated with the proxy to server connection (Source Internet Protocol (IP) Address, Destination IP Address, Source Port Number, Destination Port Number, Protocol). If the connection is L5, then a pointer to a server TCB (sTCB) is allocated from the sTCB FIFO 418. This points to the TCB data structure stored in the TCB database that describes the server to client connection.

The layer 4 TCP protocol encapsulates layer 5 messages, which can use a number of different HTTP methods (GET, HEAD, POST, etc). HTTP is the "payload" of the layer 4 message. POST methods may also contain layer 5 payload in the form of binary or ASCII data. As used herein, "payload" refers to the payload of a POST method. HTTP is a character-based protocol, which consists of a text header terminated with an end-of-header token. HTTP payload, if present, follows this token. The HTTP header is analyzed by the system to determine if the object following an end-of-message token is payload or a new header. If the HTTP header contains the keyword-value pair "Content-Length, Payload-Length", then a payload of length payload-length follows the header.

Because the PM 406 does not maintain the contiguity information, the EMU 410 provides the acknowledgement service when instructed to do so. As the reassembly buffer, the storage area within the EMU 410 for HTTP headers and payload, fills up, the TCP window is reduced until the client is not permitted to send more data. Only after the buffer contents have been bound to a server, sent to that server, and acknowledged by that server can the buffer be cleared and the TCP window reopened. The PM 406 and the EMU 410 cooperate to manage the appropriate window size.

The term "buffer" is used to describe the memory space associated with each layer 5 connection. The term "reassembly buffer" denotes the portion of the buffer used to reassembly layer 5 messages. The remaining portion of the buffer stores control data and assorted processing data.

Layer 5 messages (HTTP) are reassembled and checked for payload material before they are sent to the CA 442. This task, as well as tracking the completeness of message payloads, is the responsibility of the EMU 410.

An array of external memory included in the EMU buffer 430 serves as an assembly area for message fragments that can arrive in any order and possibly overlap each other. The EMU 410 accepts these message fragments, assembles them in the correct order, and determines when a message is complete. In operation, the EMU 410 supports the assembly of messages from the same number of concurrent client connections as there are client TCBs allocated by the CPU 412. The EMU 410 accepts message packets at line rate from the switch and is able to extract all necessary information within three minimal packet spacing time. It is assumed that each connection requires a SYN and ACK to establish the TCP/IP threeway handshake before any message data can be sent. These message packets can be anywhere from one byte to the MSS in size and address any portion of the 32-bit sequence number space. Each connection is allocated a contiguous reassembly buffer of 1536 bytes (FIG. 6*a*), which is larger than the largest MSS value of 1460 bytes. The start of the reassembly buffer is locked to the sequence number associated with the start of the connection. As the message or message fragment enters the EMU 410, the contiguous portion of the message (possibly including fragments from previous message fragments) is parsed to determine if a complete HTTP header is present. The EMU 410 then sends the PM a deferred acknowledgment, if the PM so requests, indicating what sequence number the switch should acknowledge to the client.

A typical client-server connection will cause the following sequence of events in the EMU 410. The client SYN received by the switch 401 causes a buffer reset to be launched into the EMU 410, clearing the necessary memory. The client TCP datagram (HTTP) is posted to the EMU 410 by the switch upon receipt. The EMU analyzes the contents of the buffer and, if it finds a terminated contiguous element, sends this element to the content analyzer 442. The client is then bound to a server using the results of the content analysis and a connection to the server established. Upon completion of the three-way handshake, the switch issues a read command for the data stored in the EMU buffer 430. The EMU 410 sends the data element from the buffer 430 to the switch. When the server has acknowledged the element, the switch 401 issues a purge command, clearing the element from the buffer 430. The EMU begins scanning for the next element in the buffer 430.

The EMU 410 acts as a passive agent accepting commands from other engines in the switch 401. Each command may generate a response to the switch and possibly a transaction to the content analyzer 442. Upon every internal message post from the switch components, the EMU 410 determines the length of the largest leftwise contiguous portion of the message and informs the components (if requested) to acknowledge the client up to that point.

IP packets arriving from the client or server may arrive out of order, overlap previous packets, or arrive twice. Out of order packets will result in gaps between portions of the message as it is being reassembled. The packets and associated payload (if any) are reassembled by the EMU 410 into a complete message before that message can be passed to the content analyzer 442 for parsing.

The EMU logic is configured to identify the start of the message, the end of the message, and whether all packets in between are present and correctly reassembled. The length of any payload is extracted from the message header as the end of a payload is not demarcated with any special sequence. Because portions of messages from different connections may be arriving at the same time, the EMU 410 allocates storage for each message and identifies the correct positioning of the incoming message fragment. When a message has been completely recovered, the EMU passes this message to the content analyzer 442 and, upon request, to the other engines in the switch 401 for transport to the target server.

Additionally, the EMU 410 maintains a leftwise contiguity pointer such that the switch 401 can send the appropriate acknowledgment signal to the client when message fragments are received. The switch 401 maintains leftwise contiguity as long as message fragments arrive in order. When the first out-of-order fragment arrives, the switch 401 requires the EMU 410 to calculate the leftwise contiguity for that connection. Reassembly of a layer 5 stream requires the identification of two conditions: completeness and termination.

Completeness is identified by having a contiguous segment of data that is correctly terminated. Identifying termination requires a series of tests to determine in what manner the length of the message is specified. Message length is determined by identifying one of three conditions: chunked transfer encoding, content length header, or lack of a content length header. Refer to RFC 2616, "Hypertext Transfer Protocol," for a complete discussion of the determination of message length. Although message termination requires the determination of payload length, header identification does not. It is thus possible to send a complete header to the content analyzer 442 before verifying that a completed message has been assembled.

Figure 6A:
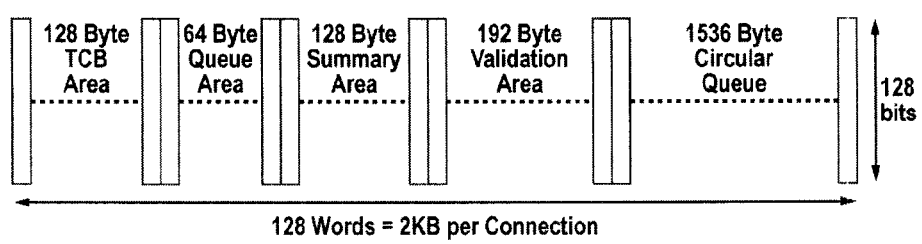

As illustrated in FIG. 6*a*, each connection is allocated a 2K page of physical memory to assemble incoming message and hold all necessary connection state information. Part of this connection state is a 128 byte summary area (summary memory) used to identify completeness and termination. The 2K page also contains a 192 byte validation area which maps directly to a 1536 byte assembly area. The assembly area contains all message packets that have been received as part of the connection. Packets are placed into this area based on the packet sequence number to assure correct reassembly.

The validation memory is a one-to-one mapping of the assembly area such that each bit of validation represents one byte of assembly. In this manner, holes in the assembly area are detected by unset bits in the validation bit fields.

Likewise, the summary memory contains a contiguity array, which is mapped one-to-one onto the validation memory. This contiguity array encodes every eight bits of validation memory into 2-bit summary values (FIG. 9). These summary values (states) can be parsed quickly to determine header completeness.

The summary memory also contains all necessary state information regarding the connection. This includes the sequence number, which is associated with the beginning of the message. This number is locked to the buffer by the switch before any message fragments are accepted.

Because the assembly area functions as a circular queue, the summary area also contains pointers to the beginning of the queue and the length of any completed header found. If a payload is identified, the summary area also contains the length of the payload.

To conserve the switch memory bandwidth, the client and server TCBs for each connection are also stored within the 2K page. Every data post from the switch contains these TCBs that are immediately copied into a holding area for each connection. When a deferred event is processed, the TCB is retrieved from memory and validated by checking the generation count. This prevents a deferred event whose connection has been reset from completing. Because no transactions entering the EMU 410 can be stalled while all transactions leaving the EMU 410 are deferred, the EMU must maintain queues of deferred events. These queues are able to sustain an entry for every connection. The EMU 410 maintains an internal queue of 1024 entries, and pages entries into memory when this capacity is exceeded.

A buffer area allocated to a connection is addressed by the TCB index corresponding to the connector. The summary area maintains pointers identifying the start of a message in the circular queue, the most leftwise contiguous point of the message, whether or not and end has been detected and the content length (if identified). When a message fragment arrives, its sequence number is translated into a queue insertion pointer and the fragment data entered into the message storage area. A complete message header is observed when two consecutive Carriage Return, Line Feeds (CRLFx2) are detected and all intervening bytes from the start point are valid. There can be any number of CRLFx2 in the message payload, but the first CRLFx2 always identifies the end of the header. Once a complete header is detected, it is copied to the CA 442. After a binding is created, the header message in the receive buffer is copied to a server. Once the proper acknowledgments are performed, the buffer header is flushed. At that time, a new start point will be set corresponding to the beginning of the next header, its payload, or the continuation of the payload.

It should be noted that although RFC 2616 specifies a CRLFx2 signature to terminate a header, actual implementations vary. The EMU 410 can also accept LFCRx2, LFx2 and CRx2 signatures.

Message headers are scanned for payload on the way to the switch. This is necessary to prevent the need for rescan during pipelined requests. If a message payload is detected, its length is recorded in the summary area and a subsequent purging of the message header will cause the payload length to be compared with the contiguity of the validation and summary areas. If the payload is complete, a deferred event informing the switch of this condition is queued. Otherwise, the assembly area keeps accepting packets until the payload is complete or the buffer has been filled. There may be more message payload than buffer space. During this time the payload will circulate through the buffer and a counter continues to track all the payload. At no time will the buffer be overrun because the advertised window size cannot be larger than the space available in the buffer. After receiving each message or message fragment, the EMU may generate a deferred acknowledgment signal to the switch indicating to which point the message can be acknowledged by analyzing the leftwise contiguity of the message.

If a large cookie is present in the header, the assembly buffer could fill before the end of the header arrives. Under this condition, the EMU will send the entire buffer to the content analyzer. The EMU will mark the buffer as a partial header and send all but the last 32 bytes to the switch after a binding has been created by SLB. The 32 bytes must be kept to catch the "content-length" string or CRLFx2, which might cross the 1536 byte boundary.

In order to recognize the headers in a raw input data stream, a string parsing system is implemented that defines the characteristics of a complete header. The parser uses filtering protocols to identify complete headers in the incoming packet stream and established pointers to them. The information is stored in a summary memory for quick retrieval and the packets are then stored in individual assembly areas located in the buffer memory. This scheme allows for the assembly of individual packets that can arrive in any sequence into a contiguous header, the identification of the header and payload elements (without having to reparse the stream in the buffer memory) and handling of the possibility of multiple requests within one message.

The following discussion details the operation of the EMU 410 as an operational structure of switch 401. Implementation of the functions of the EMU 410 as an element of the switch should not be seen as limiting. The EMU functionality can be embodied as a separate structure, unaffiliated with the other engines and components included in the switch 401.

During typical operation, the PM 406 posts one or more message segments to the EMU 410 and receives a deferred acknowledgment, if one was requested. Upon detection of a completed header, the EMU 410 posts the header to the CA 442 subsequently analyzes the header and informs the PE 402 as to which group of servers can accept the header. The PE 402 selects a server and passes the properties of the said server to the PM 406. When the PM 406 has established a connection to the required server, the PM 406 requests the header from the EMU 410 and sends it to this server. When an acknowledgment is received, the PM 406 instructs the EMU 410 to purge the header and the cycle repeats.

The PM messages to the EMU 410 begin with a 4-bit command, the buffer address, the post sequence number and the length of the message header and data. In response to these messages, the EMU starts memory reads from the summary data of the specified buffer.

The EMU 410 processes all requests for packet processing or header data as deferred events. When a deferred event is processed, the TCB is retrieved from the copy stored in EMU memory and validated by checking the generation count. This prevents a deferred event whose connection has been reset from completing.

The EMU buffer 430 contents are presented to the policy service once a completed header is identified, or when the buffer 430 is completely filled. To support TCP acknowledge (ACK) generation, the EMU 410 also provides feedback to the PM 406 about the current contiguity of the received data buffer.

As packets arrive, their sequence numbers identify their position in the buffer memory relative to the start point. The switch shipped this sequence number with the packet data to the EMU. As the packet is streamed into the EMU, its contents are analyzed by a parser and summarized. As packets arrive, they may carry complete or partial objects. If an object straddles two packets, then when both packets are received and assembled, the Buffer Management Unit must be able to identify the object. This is accomplished by reading sufficient locations in the buffer memory before and after the incoming packet to handle any alignment of the longest object. Thus, loading a new packet into the buffer memory requires a READ, WRITE x N operation. The parser will string search the packet plus the look-ahead and look-behind locations for keywords. The buffer manager organizes the buffer pointers and manages the summary information. The contiguity of the entire message buffer is being evaluated as the packet and associated before and after information is being parsed. By integrating the insertion point and length of the incoming packet with the previous message fragments, the acknowledgment pointer is obtained and passed to the switch as a deferred acknowledgment (if requested). The EMU does not guarantee immediate delivery of the deferred acknowledgment. The switch will generate its own acknowledgements as long as the incoming message packets are contiguous. As soon as a single packet is noncontiguous, the switch will request deferred acknowledgements from the EMU for all future packets associated with that connection. The EMU maintains four request queues, which are arbitrated by a priority mechanism. These are the ACK Queue for posting deferred acknowledgements to the switch, the CA Queue for posting completed headers to the content analyzer, the Data Queue for posting header and payload data to the switch (upon request) and the Partial Payload Queue for alerting the switch that a portion of a long payload element has been assembled and is ready for transport.

The switch posts to the EMU are stored in the buffer memory. Posts consisting of complete HTTP headers can be scheduled for posting to the content analyzer immediately. However, partial headers must first be assembled and checked for completeness. The EMU must track partial headers and payloads that span multiple buffers.

Layer 5 streams from the switch cannot be stalled. To do otherwise will cause back pressure to be applied to the network with a corresponding decrease of system efficiency. In order to accomplish this, there must be an input queue with sufficient depth to absorb the stream in real time. The interface to buffer memory is effectively multi-ported by quadrupling the bandwidth of the switch to the EMU interface. Because all reads and writes for the switch post will be to the same 2K page, the precharge and column accesses are amortized. After derating the memory system performance to account for refreshes and alignment issues, the buffer memory will be able to sustain twice the switch to the EMU transfer bandwidth. Write transactions are treated as having precedence over read transactions. When a read is in process and a write transaction begins, the read transaction is suspended until the write can be completed. Under specific circumstances, an interrupted read may be squashed and rescheduled in favor of a higher priority operation. Reads are prioritized by length as the probability of an interruption increases with read length.

The receive buffer assembles header sections into one contiguous header string. As IP packets arrive, the IP and TCP headers are stripped by the switch. The remaining HTTP header and optional payload are passed to the EMU where the receive buffer places the sections into a buffer according to the sequence number offset. A leftwise contiguous pointer indicates the most leftwise contiguous point in the buffer from the start point. This pointer is returned to the switch to ACK the client if a deferred acknowledgement is requested.

While still in the input path, the incoming packet is merged and aligned with the before and after data from the assembly buffer and scanned for all relevant strings. The input path also discards any portions of the incoming packet that would be placed outside the physical limits of the reassembly buffer. As the data stream from the switch enters the EMU, the summary entry is accessed. The first data word from the switch transfer contains the buffer index, sequence number and length fields.

The EMU performs two memory reads to calculate all necessary information about this transfer. As soon as the first word of the incoming packet arrives, the EMU retrieves the physical offset of the start pointer (a pointer to the beginning of the circular reassembly queue) and the summary information from the buffer specified. As soon as the start pointer physical offset becomes available, the physical addresses of the merge data (before and after data used for scanning) are calculated along with the addresses of the corresponding validation memory. A final memory read is required to retrieve the validation bits for the most leftwise contiguous portion of the message.

If the incoming packet fills a hole in the validation memory, then the most leftwise contiguous point could be anywhere in the buffer. The summary parse engine is responsible for parsing the summary information, incorporating the information from the incoming packet, and determining the exact location of the most leftwise contiguous point of the message. This summary parser is also responsible for detecting header completion in a subsequent operation.

During the transfer of a complete header (with or without complete payload), the input path will detect that the input stream is being written to the start pointer of a message buffer and contains one of the defined key works for an HTTP datagram (GET, POST, and the like.). The subsequent bytes of the header are scanned for the CRLFx2 marker. If the latter marker is found then the header is complete. To increase throughput, the switch data posts which appear to be complete headers (start with a key word and addresses the beginning of a buffer) are speculatively written to the content analyzer if the unit is not busy. Failure to obtain a completed header will result in the transfer to CA being aborted. The message data (whether complete or not) is still inserted into the reassembly buffer. When the last fragment of a completed header is receiver, the buffer address of the completed entry is entered into the CA queue. At the earliest possible time, the header will be sent to the content analyzer. As with any post from the switch, a deferred acknowledgment signal is returned if requested. The header buffer will now continue to accumulate any additional data and await a data read and eventual purge signal from the switch. Completed partial payloads are handled in the same manner except that no information is passed to the content analyzer. Deferred acknowledgments may be stalled or aborted if an incoming message fragment matches the acknowledgment signal being sent.

The 2 KB SDRAM buffer is divided into five segments. The first is a 128 byte scratch area containing TCB entry corresponding to the message being assembled. Storing a pointer to the TLB would be more memory efficient, but this would require the switch to retrieve the TLB for every acknowledgment signal. A 64 byte queue area provides storage for up to 16 deferred events. The queue managers track FIFO pointers that determine which buffer will be used for the next FIFO read or write. The queue area is followed by the 128 byte summary area, which contains all state and relevant information regarding the connection. A 192 byte validation area contains the valid bits associated with the reassembly area. The reassembly area is a circular queue of 1536 bytes. FIGS. 6a-b shows the buffer memory footprint for a single 2K page.

The EMU maintains two deferred event queues that manage four types of deferred events. The CA Queue manages completed headers. The CA disposal engine retrieves events from the CA Queue and causes the header from the corresponding buffer to be read and transmitted to the content analyzer. The PM Queue manages deferred acknowledgements, requests for a data and completed partial elements (headers or payloads). The PM disposal engine is responsible for retrieving events from the PM queue and correctly dispatching them. Both disposal engines operate only when memory bandwidth is available. The queue managers are also responsible for maintaining up to 1024 internal deferred events before paging events into memory. Events are paged in groups of eight into the queue memory areas of the memory buffers. Paging begins when a queue reaches 75% capacity and must be able to sustain one deferred event entering each queue every 672 nS, the minimum packet interval.

Each summary area consists of a reserved area, a length rewrite field, a buffer control field and a contiguity bit field. The reserved area consists of three 16 byte words reserved for future usage. These words are considered fast rewrite fields because by only contain one item of information, it is not necessary to use a read-modify-write cycle to update the memory. The length rewrite field is a fast-rewrite field containing the length of the payload associated with the current header, a valid bit indicating if a payload was present in the header and a generation count obtained from the TCB Storage at the time the length was identified. This generation count prevents any problems arising from connections that were reset while a data post to the switch was in progress. The 16 byte buffer control field contains all the state associated with the connection. Finally, the contiguity bit field contains an encoding of the validation memory from which contiguity and completeness can be determined. This field is used twice during a switch data post to the EMU. First, the leftwise contiguity is determined by calculating the address of the last validation bits. This can be accomplished without having received the first data word of the post. When the post has completed, the summary bits are updated and a new scan determines if a completed header is present.

FIGS. 7a-b detail the fields of the EMU Summary Area.

The Post Length Rewrite Mailbox is used by the PM Event Processor to write the length of the last entity that was read by the switch. For a subsequent Purge operation, this length is used to invalidate data in the assembly buffer.

The Payload Length Rewrite Mailbox is used by the PM Event Processor to write the length of the "content-Length" variable if identified in a header that was read by the switch. For a subsequent Purge operation, this length is used to initialize the Payload Tracker and change the state of the buffer to a payload entity.

This value is the TCP sequence number that corresponds to the beginning of the entity currently being assembled. It is initialized by a Lock-SN command from the switch and incremented during a Purge Operation.

Because all events processed by the EMU 410 are deferred, it is possible that a deferred event queue entry exists for a buffer that has been reset and may contain new data. The switch is responsible for incrementing the Generation Count (GC) for every new connection. When deferred events are extracted by either event processor, the generation count is checked against the current Generation Count in the buffer. Events for buffers that no longer are valid are dropped.

The Start Pointer Physical Address (SPPA) is the physical offset of the start pointer within the assembly buffer. This value is initialized to 12'h200 upon reset and increments towards 12'h7FF with wraparound to 12'h200. During a purge operation, the SPPA is advanced by the length of the entity being purged.

The End Pointer (EP) points to the 8-byte word that contains the end sequence of a completed header. This address can then be used to load the last words of header data and determine the actual end point. This value should be considered invalid unless a header has been identified.

The Payload Tracker is used to track long payloads of HTTP headers. When the payload has been identified by the post to the switch of the associated header, the Post-Purge Engine will set its termination condition to be either a filled buffer or contiguity to the payload tracker.

Left-Wise Contiguity (LWC) is determined after every Post or Purge operation. It is the value used to generate the Acknowledge Sequence Number during a deferred acknowledgement. Contiguity is measured relative the SPA value.

General Status (GS) is used by the Post-Purge Engine to determine the next state of a buffer after every Post or Purge operation. The bit fields are defined as shown in FIG. 8a.

Principle Status (PS) is used by all the EMU components to determine the condition of a connection buffer. The bit fields are defined as shown in FIG. 8b. The object class field is a 3-bit field that is set during the connection setup (Lock SN) operation from the value of the CSI passed to the EMU 410 from the switch 401. As shown in FIG. 8c, three object classes are supported. The use of the SSL and Immediate Post classes require proper configuration of the EMU SSL Length and EMU Immediate Post Length registers.

The summary memory contiguity coding maps two contiguity bits onto every eight bytes of buffer memory. The buffer memory uses the validation bits to determine whether each bit is a valid datum. It is possible for an HTTP datagram to arrive in one byte fragments sent only every other byte. Thus, each byte of the partial message must be uniquely tagged. The summary memory stores a special coding of the eight validation bits representing each eight bytes of buffer memory. The summary encoding must recognize if each 8 byte word contains valid data, if an end is present and whether this end is in a contiguous block. Table FIG. 9 shows the encoding format of the contiguity bits in the summary memory.

The Validation Memory contains a valid bit for every byte of memory in the reassembly area. This memory is updated during every Post and Purge operation.

The Reassembly area holds all the data being assembled from the switch posts. Due to the size of this memory, it is not cleared during a Purge Operation.

As the EMU receives a data post from the switch, the buffer address is used immediately to start an access to the summary memory. Because the offset and message length also arrives in the first TPCI clock, the buffer accesses for the before and after data are started as soon as the start pointer physical address is loaded. As the summary data streams in, the EMU determines the point of leftwise contiguity of the buffer. The contiguity bits are also scanned to determine if a complete header exists as soon as the data post has been parsed. This condition is met by having a valid start pointer (check validation bits for start pointer) and any number of contiguity bits valued b'01 (Complete) followed by b'11 (Complete End). Completed headers are scheduled for transmission to the content analyzer. The packet data is written to the buffer memory regardless or whether the header is complete or not. The incoming packet is merged with the relevant before and after data and passed into a line rate parser. If the summary status indicates a partial header is being assembled, the completed header is not copied to the content analyzer. A partial header that reaches the maximum buffer size without the detection of an end is treated as a partial payload. In the event a payload has been detected, a completed end is defined as having received the same number of bytes as is stored in the Content Length field. Partial payloads that fill the buffer (and long headers which fill the buffer) result in a "Partial Payload" post from the EMU to the switch.

While various embodiments of the invention have been described, it will be apparent to those of ordinary skill in the art that many more embodiments and implementations are possible that are within the scope of this invention.

What is claimed is:

1. A method of reassembling a plurality of information elements included in one or more packets that may be received in any order, comprising:
   providing a buffer having a plurality of locations, each location capable of storing an information element;
   providing a plurality of flags, in a memory, in one-to-one correspondence with the plurality of locations in the buffer, each flag to indicate whether an information element is stored or not at the corresponding location in the buffer;
   storing a plurality of information elements in the buffer according to one or more sequence numbers, associated with the one or more packets, that determine a correct order, wherein the sequence number for a packet determines the location in the buffer where any information element included in the packet is stored, so that the information elements, if received in a different order, are placed in the correct order;
   for each information element stored in the buffer, setting the flag corresponding to the location in the buffer where the data element is stored to indicate storage of an information element at the location; and
   scanning information derived from the plurality of flags in the memory to determine whether reassembly is complete.

2. The method of claim 1, wherein each of the information elements is a byte.

3. The method of claim 1, wherein each of the flags is a bit.

4. The method of claim 1, wherein the step of scanning includes:
   determining a contiguity of the plurality of information elements stored in the buffer based on the corresponding plurality of flags in the memory.

5. The method of claim 1, further comprising:
   setting an encoded value as a function of at least one of the flags; and
   determining whether a token, comprising one or more of the information elements, is stored in the buffer based on the encoded value.

6. The method of claim 5, wherein the encoded value is a single or multibit value stored in memory.

7. The method of claim 5, wherein the encoded value corresponds to a plurality of flags stored in the memory.

8. A system for handling packet traffic, comprising:
   a buffer for storing a plurality of information elements included in one or more packets that may be received in any order, the buffer having a plurality of locations, the plurality of information elements being stored according to one or more sequence numbers, associated with the one or more packets, that determine a correct order, wherein the sequence number for a packet determines the location in the buffer where any information element included in the packet is stored, so that the information elements, if received in a different order, are placed in the correct order;
   a memory for storing a plurality of validity indicators in-one-to-one correspondence with the plurality of locations of the buffer, each such validity indicator to indicate whether an information element is stored or not at the corresponding location of the buffer;
   a first logic circuit capable of setting the validity indicators based on storage of the information elements at the corresponding locations of the buffer; and a second logic circuit capable of determining a contiguity of the information elements stored in the buffer based on the settings of the validity indicators.

9. The system of claim 8, wherein the information elements are bytes.

10. The system of claim 8, wherein the validity indicators are bits.

11. The system of claim 8, further comprising:
a second memory for storing a summary value;
a third logic circuit for setting the summary value as a function of one or more of the validity indicators; and
a fourth logic circuit for determining whether a token, comprising one or more of the information elements, is stored in the buffer based on the summary value.

12. The system of claim 11, wherein the summary value is a single or multibit value stored in the second memory.

13. The system of claim 8, wherein the buffer includes a circular buffer.

14. A system for handling packet traffic, comprising:
means for storing a plurality of information elements included in one or more packets, which may be received in any order, at a plurality of locations according to one or more sequence numbers, associated with the one or more packets, that determine a correct order, a sequence number for a packet determining the location where any information element included in the packet is stored, so that the information elements, if received in a different order, are placed in the correct order;
means for storing a plurality of validity indicators that are in one-to-one correspondence with the plurality of locations, wherein each of the validity indicators is to indicate whether an information element is stored or not at the corresponding location;
means for setting the validity indicators based on storage of the information elements in the corresponding locations; and
means for determining a contiguity of the stored information elements based on the settings of the validity indicators.

15. The system of claim 14, further comprising:
means for setting a summary value as a function of one or more of the validity indicators; and
means for determining whether a token, comprising one or more of the information elements, is present among the stored information elements based on the summary value.

16. A method of reassembling a plurality of information elements that may be received in any order comprising:
providing a memory having a plurality of locations, each for storing an information element;
providing a plurality of indicators in one-to-one correspondence with the plurality of locations, each such indicator to indicate whether an information element is stored or not at the corresponding location in the memory;
storing a plurality of information elements in the memory according to sequence numbers, associated with the information elements, that determine a correct order wherein the sequence number for an information element determines the location in the memory where the information element is stored, so that the information elements, if received in a different order, are placed in the correct order;
for each information element stored in the memory, setting the indicator for the corresponding location to indicate storage of the information element at that location; and
determining if reassembly is complete by examining contiguity of one or more of the locations in the memory based on settings of the corresponding indicators.

17. The method of claim 16 wherein the determining step comprises:
deriving encoded information for each of one or more groups of locations in the memory; and
determining contiguity of one or more groups of locations in the memory based on settings of the encoded information for the corresponding one or more groups of locations in the memory.

18. The method of claim 17 further comprising determining whether an end of message is present in a group of locations based on settings of the encoded information corresponding to that group of locations.

19. The method of claim 18 further comprising determining contiguity for all locations in the group preceding the end of message based on settings of the encoded information corresponding to that group of locations.

20. The method of claim 16 wherein each of the plurality of information elements has an order in a message, the method further comprising storing the plurality of information elements in the memory in the same order as in the message.

* * * * *